US010919531B2

(12) United States Patent
Ulbrich et al.

(10) Patent No.: US 10,919,531 B2
(45) Date of Patent: Feb. 16, 2021

(54) METHOD AND DEVICE IN A MOTOR VEHICLE FOR AN AUTOMATIC DRIVE

(71) Applicant: VOLKSWAGEN AG, Wolfsburg (DE)

(72) Inventors: Simon Ulbrich, Ingolstadt (DE); Simon Grossjohann, Wolfsburg (DE); Kai Homeier, Hannover (DE); Christian Appelt, Gifhorn (DE)

(73) Assignee: Volkswagen AG ( * ) Notice: Subject to any disclaimer, the term of this patent is extended or adjusted under 35 U.S.C. 154(b) by 223 days.

(21) Appl. No.: 15/759,892

(22) PCT Filed: Sep. 13, 2016

(86) PCT No.: PCT/EP2016/071588
§ 371 (c)(1),
(2) Date: Mar. 14, 2018

(87) PCT Pub. No.: WO2017/046101
PCT Pub. Date: Mar. 23, 2017

(65) Prior Publication Data
US 2019/0047571 A1 Feb. 14, 2019

(30) Foreign Application Priority Data

Sep. 14, 2015 (DE) .................... 10 2015 217 498.0

(51) Int. Cl.
*B60W 30/18* (2012.01)
*B62D 15/02* (2006.01)
*B60W 10/04* (2006.01)
*B60W 10/18* (2012.01)
*B60W 10/20* (2006.01)
*B60W 30/09* (2012.01)
(Continued)

(52) U.S. Cl.
CPC ... *B60W 30/18163* (2013.01); *B62D 15/0255* (2013.01); *B62D 15/0265* (2013.01);
(Continued)

(58) Field of Classification Search
CPC ........... B60W 30/18163; B60W 10/04; B60W 10/18; B60W 10/20; B60W 30/09; B60W 60/0027; B62D 15/0255; B62D 15/0265
See application file for complete search history.

(56) References Cited

U.S. PATENT DOCUMENTS 8,818,681 B1 * 8/2014 Dolgov ................ G05D 1/0055
701/96
2009/0088925 A1 * 4/2009 Sugawara ............. B60W 30/12
701/41

FOREIGN PATENT DOCUMENTS

DE  102005062275 A1  6/2007
DE  102006043149 A1  3/2008
(Continued)

OTHER PUBLICATIONS

Meng Wang et. al., "Game Theoretic Approach for Predictive Lane-Changing and Car-Following Control", Jul. 2015, Elsevier (Year: 2015).*
(Continued)

*Primary Examiner* — Anshul Sood
(74) *Attorney, Agent, or Firm* — Barnes and Thornburg LLP

(57) ABSTRACT

A method in a transportation vehicle for an automatic drive which includes detecting additional transportation vehicles in the surroundings of the transportation vehicle by at least one sensor system, detecting and identifying lanes by the at least one sensor system, assigning the detected additional transportation vehicles to the detected lanes by a controller, and identifying and evaluating an intention to pass of another transportation vehicle by a pass assistance device. If an intention to pass has been identified, the method also includes calculating a total use of a possible lane change by a predictive device and adapting a drive behavior of the transportation vehicle by the controller, wherein the possible (Continued)

lane change is carried out if the calculated total use reaches or exceeds a specified total use threshold, and the possible lane change is not carried out if the calculated total use does not exceed the specified total use threshold.

7 Claims, 4 Drawing Sheets

(51) Int. Cl.
*G05D 1/00* (2006.01)
*G05D 1/02* (2020.01)
(52) U.S. Cl.
CPC ............. *B60W 10/04* (2013.01); *B60W 10/18* (2013.01); *B60W 10/20* (2013.01); *B60W 30/09* (2013.01); *G05D 1/0027* (2013.01); *G05D 1/0278* (2013.01)

(56) References Cited

FOREIGN PATENT DOCUMENTS

| | | |
|---|---|---|
| DE | 102007033887 A1 | 9/2008 |
| DE | 102013003219 A1 | 9/2013 |
| DE | 102012214979 A1 | 2/2014 |
| JP | 2004157731 A * | 6/2004 |
| WO | 2014204381 A1 | 12/2014 |

OTHER PUBLICATIONS

Search Report for International Patent Application No. PCT/EP2016/071588, dated Nov. 29, 2016.

Search Report for German Patent Application No. 10 2015 217 498.0; dated May 24, 2016.

* cited by examiner

METHOD AND DEVICE IN A MOTOR VEHICLE FOR AN AUTOMATIC DRIVE

PRIORITY CLAIM

This patent application is a U.S. National Phase of International Patent Application No. PCT/EP2016/071588, filed 13 Sep. 2016, which claims priority to German Patent Application No. 10 2015 217 498.0, filed 14 Sep. 2015, the disclosures of which are incorporated herein by reference in their entireties.

SUMMARY

Illustrative embodiments relate to a method and to a device in a transportation vehicle for automated driving.

BRIEF DESCRIPTION OF THE DRAWINGS

The disclosed embodiments will be explained in more detail with reference to the figures, of which.

DETAILED DESCRIPTION

Figure 1:
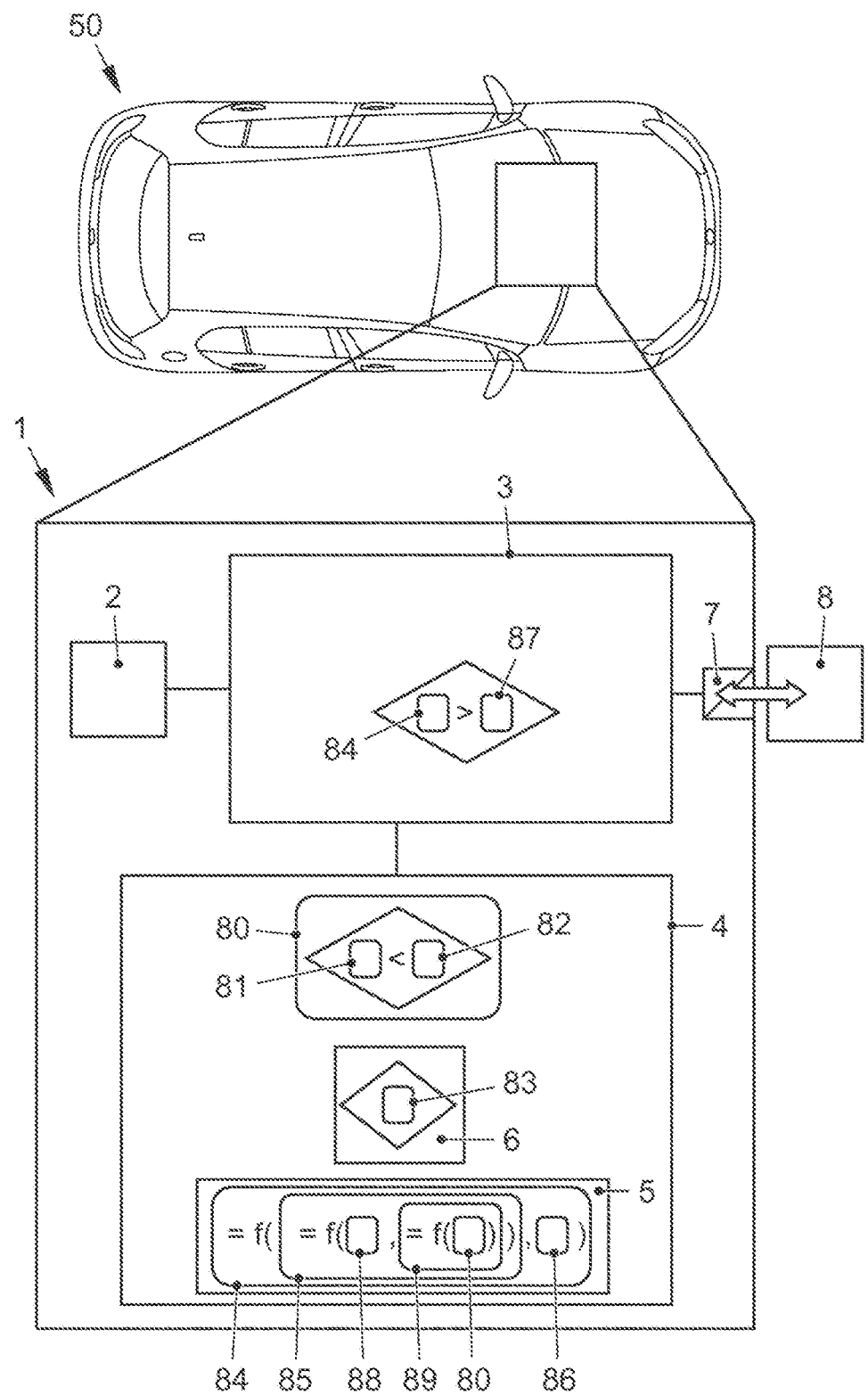
FIG. 1 shows a schematic illustration of an embodiment of the device in a transportation vehicle for automated driving of a transportation vehicle with an overtaking assistance operator.

Modern transportation vehicles have a large number of assistance systems which assist the driver when driving the transportation vehicle. In this context, increasing use is being made of semi-autonomous and autonomous systems which permit semi-automatic or fully automatic control of the transportation vehicle.

When automated transportation vehicles are developed for road traffic on freeways or freeway-like roads with the requirement to drive on the right (or on the left), situations frequently occur in which an automated transportation vehicle drives on the left-hand (or right-side) lane. Since an automated transportation vehicle has to comply with applicable speed limits, scenarios often occur in which a transportation vehicle approaches from the rear and wishes to drive faster than the automated transportation vehicle.

To avoid this following transportation vehicle being impeded, the automated transportation vehicle can decide whether it leaves the lane or not. In addition, the comfort of the passengers in the automated transportation vehicle can be improved if other transportation vehicles do not drive up very close behind them, harass them or express their wish to overtake by flashing the lights or sound their horn to express their desire to overtake the automated transportation vehicle.

DE 10 2006 043 149 A1 discloses a transverse guidance and lateral guidance assistant for a transportation vehicle for assisting the driver during a lane change with a trajectory calculation unit, wherein in the event of a desire to change lane and when a sufficient gap for safe cutting in onto the target lane is identified, the trajectory calculation unit determines a lane change trajectory from the data of a surroundings sensor system. The trajectory calculation unit calculates such a lane change trajectory that the impediment of a transportation vehicle to the rear which is affected by the lane change is minimized. Subsequently, a command apparatus outputs, as a function of the determined lane change trajectory, a transverse guidance command to a transverse guidance control system and an acceleration command to a distance-related cruise control system.

DE 10 2013 003 219 A1 discloses an automatic indication of an intention to overtake by a following transportation vehicle. A method and a driver assistance system are disclosed for assisting a driver of a transportation vehicle when driving on an overtaking lane of an at least two-lane road which has, in the direction of travel of the transportation vehicle, a normal lane and, at least adjacent thereto, the overtaking lane, wherein an intention of a transportation vehicle to overtake is then indicated automatically to a transportation vehicle which is travelling ahead of the transportation vehicle. According to the method, the intention to overtake is indicated automatically when the following conditions are met: the transportation vehicle is following the transportation vehicle on the overtaking lane using an adaptive cruise control system, the transportation vehicle could overtake the transportation vehicle travelling ahead on the overtaking lane if the transportation vehicle were to change onto the normal lane, where it is possible for the transportation vehicle to change from the overtaking lane to the normal lane, and the transportation vehicle has an identifiable intention to overtake the transportation vehicle travelling ahead, and the transportation vehicle travelling ahead is travelling for longer than a predefined time T0 without an identifiable intention to overtake or without an identifiable intention to move out onto the overtaking lane.

The disclosed embodiments are based on the technical problem of providing a method and a device in a transportation vehicle for automated driving, in which an improved automated lane change is possible.

The technical problem is solved according to the disclosure by a method and a device.

For this purpose, a method is made available in a transportation vehicle for automated driving, comprising the following operations: detecting other transportation vehicles in the surroundings of the transportation vehicle by at least one sensor system, detecting and identifying lanes by the at least one sensor system, assigning the detected other transportation vehicles to the identified lanes by a controller, identifying and evaluating an intention to overtake of another transportation vehicle by an overtaking assistance apparatus, and if an intention to overtake has been identified: calculating a total benefit of a possible lane change by a prediction device, adapting a driving behavior of the transportation vehicle by the controller, wherein the possible lane change is carried out if the calculated total benefit reaches or exceeds a predefined total benefit threshold value, and wherein the possible lane change is not carried out if the calculated total benefit does not exceed the predefined total benefit threshold value.

In addition, a device is provided in a transportation vehicle for automated driving, comprising: at least one sensor system for detecting other transportation vehicles in the surroundings of the transportation vehicle, and for detecting and identifying lanes, a controller, an overtaking assistance apparatus, wherein the overtaking assistance apparatus comprises a prediction apparatus, and wherein the controller is designed to assign identified lanes to other transportation vehicles, and wherein the overtaking assistance apparatus is designed to identify and evaluate an intention to overtake of another transportation vehicle to the rear, and the prediction apparatus is designed to calculate a total benefit of a possible lane change if an intention to overtake has been identified, and the controller adapts a driving behavior of the transportation vehicle by controlling at least one actuator system of the transportation vehicle, wherein the controller carries out a lane change if the calculated total benefit reaches or exceeds a predefined total benefit threshold value, and wherein the controller does not carry out the lane change if the calculated total benefit does not exceed the predefined total benefit threshold value.

The basic concept of the disclosure lies in identifying an intention to overtake of a transportation vehicle to the rear on the current lane of a transportation vehicle, and to evaluate the intention within the overall concept of a current situation. The possible lane change is brought about or not depending on whether it is evaluated overall as being beneficial or not to leave the current lane by a possible lane change onto a target lane.

The benefit is that transportation vehicles to the rear are impeded less, as result of which an overall traffic flow can be improved. Fewer conflicts on roads and freeways, wherein a reduced conflict level leads in turn to less stress and therefore greater comfort both for the passengers of the transportation vehicle and for the passengers of the transportation vehicle to the rear. Furthermore, an improved overall traffic flow improves the environmental balance, since transportation vehicles have to be braked and accelerated less often.

In at least one disclosed embodiment there is provision that before the total benefit is calculated, time prescriptions are checked by a time prescription-checking apparatus. The time prescription serves, for example, to prevent a renewed lane change even if a time period less than the time prescription has passed since the last lane change has been carried out.

In at least one disclosed embodiment there is provision that the checking of the time prescriptions for the possible lane change by the time prescription-checking apparatus comprises the following operations: checking a time period since a last completed lane change, rejecting the possible lane change if the time period since the last completed lane change undershoots a threshold value. In this way, a type of anti-chatter protection is implemented so that a permanent lane change is prevented. Such an anti-chatter protection prevents, for example, the transportation vehicle from changing into a tight gap on a target lane because it sees a benefit in doing so, and leaves the target lane subsequently immediately again because it identifies an intention to overtake of a transportation vehicle to the rear. This prevents continuous lane changes.

In a further disclosed embodiment there is provision that the identification and evaluation of the intention to overtake by the overtaking assistance apparatus comprises the following operations: checking whether the further transportation vehicle is located to the rear on the same lane as the transportation vehicle, and if this is the case: calculating a time interval between the transportation vehicle to the rear and the transportation vehicle, checking whether there is an adjacent lane on which the transportation vehicle is able and allowed to overtake the transportation vehicle, if there is not an adjacent lane or there is no adjacent lane which can be traveled on: checking whether the calculated time interval with respect to the transportation vehicle to the rear is less than a predefined time interval threshold value, calculating an urgency level of the intention to the overtake as a function of the time interval and of the time interval threshold value. The benefit is that by using the calculated urgency level a current traffic situation between the transportation vehicle and the transportation vehicle to the rear can be estimated and evaluated very well.

The urgency level can be calculated here, for example, with the following formula:

$$\text{Urgency level}=1-0.5*(\max(\text{time interval},\text{time interval min})-\text{time interval min})/(\text{time interval threshold value}-\text{time interval min}),$$

wherein the variable time interval min is a standardizing constant which ensures that the urgency level can be at maximum 1.

The time interval can be calculated here, for example, as follows:

$$\text{Time interval}=\text{distance}(\text{transportation vehicle to the rear},\text{transportation vehicle})/(\text{speed}(\text{transportation vehicle to the rear})-\text{speed}(\text{transportation vehicle})))$$

The time interval threshold value here may be 0.6 s.

In at least one disclosed embodiment there is provision that the calculation of the total benefit of the possible lane change by the prediction apparatus comprises the following operations: calculating a current benefit contribution of the possible lane change, calculating a long-term benefit contribution of the possible lane change, wherein the total benefit is calculated as a function of the current benefit contribution and the long term benefit contribution. By taking into account a current benefit contribution, a brief benefit is taken into account, whereas a relatively long lasting benefit contribution is also included in the evaluation by the long-term benefit contribution. Therefore, both the current traffic situation and a longer lasting effect can be taken into account for a possible lane change, with the result that an optimum result can be achieved overall.

For this purpose, there is provision in at least one disclosed embodiment that a collision time with a possible transportation vehicle to the front on a target lane is taken into account during the calculation of the current benefit contribution, wherein the current benefit contribution is increased if the collision time is longer than or the same as a predefined collision time threshold value, and wherein the current benefit contribution is reduced if the collision time is shorter than the predefined collision time threshold value. In this way, it is taken into account, for example, that during the possible lane change onto the target lane, if appropriate the transportation vehicle will brake to prevent a collision with the transportation vehicle in front, and subsequent acceleration becomes necessary.

In a further disclosed embodiment there is provision that the predefined collision time threshold value is dependent on the calculated urgency level of the intention to overtake. This makes it possible to adapt the collision time threshold value in a flexible way to a current traffic situation. If, for example, a transportation vehicle to the rear harasses so that the urgency level of the identified intention to overtake is evaluated as high, a possible lane change into a small gap on the target lane is more likely to be considered than if the urgency level of the intention to overtake of the transportation vehicle to the rear is less. It is therefore always possible to react to the current traffic situation in an appropriate way.

A further disclosed embodiment provides that a change in a flow speed after a possible lane change is taken into account during the calculation of the long-term benefit contribution, wherein the long-term benefit contribution is reduced if the flow speed reduces after the possible lane change, and wherein the long-term benefit contribution is increased if the flow speed increases after the possible lane change. The benefit here is that in addition to the current traffic situation it is also possible to take into account effects of a possible lane change which act for a longer time. If, for example, the flow speed on the target lane is lower, this will, under certain circumstances, have an effect on a total travel time for a journey which is currently being made by the transportation vehicle, so that there can be drawbacks in terms of time and comfort for the passengers of the transportation vehicle.

FIG. 1 shows a schematic device 1 in a transportation vehicle 50 for automated driving of the transportation vehicle 50. The device 1 comprises a sensor system 2 for detecting other transportation vehicles in the surroundings of the transportation vehicle and for detecting and identifying lanes, a controller 3 and an overtaking assistance apparatus 4. The overtaking assistance apparatus 4 may comprise a prediction apparatus 5 and a time prescription-checking apparatus 6. Furthermore, the device 1 comprises an interface 7 via which at least one actuator system 8 of the transportation vehicle 50 can be controlled.

The at least one sensor system 2 detects the surroundings of the transportation vehicle 50 and identifies the other transportation vehicles in the surroundings. In this context, for example, both the surroundings to the rear and the surroundings to the front are detected. Likewise, the at least one sensor system 2 identifies lanes of a road which is currently being travelled on. The controller 3 assigns identified lanes to the other identified transportation vehicles. It will be assumed, for example, that there is a current lane on which the transportation vehicle is currently travelling, and a target lane to the right of the current lane.

If another transportation vehicle to the rear wishes to overtake the transportation vehicle, the other transportation vehicle will approach the transportation vehicle from behind on the current lane. The overtaking assistance apparatus 4 then identifies an intention of the transportation vehicle to the rear to overtake and evaluates it.

For this purpose, the overtaking assistance apparatus 4 firstly calculates a time interval 81 between the transportation vehicle to the rear and the transportation vehicle 50. The distance between the transportation vehicle to the rear and the transportation vehicle 50 and a relative speed between the transportation vehicle to the rear and the transportation vehicle 50 are input into the time interval 81.

The overtaking assistance apparatus 4 subsequently checks whether there is an overtaking lane on which the transportation vehicle to the rear could overtake the transportation vehicle, and whether this overtaking lane is also allowed to be used for overtaking by the transportation vehicle to the rear. If there is no overtaking lane or if it is not allowed to be used, the overtaking assistance apparatus 4 checks whether the time interval 81 is shorter than a time interval threshold value 82.

The overtaking assistance apparatus 4 subsequently calculates an urgency level 80 of the intention of the transportation vehicle to the rear to overtake. Generally, the intention to overtake is evaluated as being more urgent the faster the transportation vehicle to the rear is approaching the transportation vehicle 50, and the greater the degree to which it hassles.

The time prescription-checking apparatus 6 checks in the next method operation whether there are time prescriptions 83. Such a time prescription 83 can be, for example, a minimum period after a preceding completed lane change, wherein this minimum period is to be complied with until a further lane change is possible. Such a minimum period which is to be complied with can be, for example, 7 seconds. If the minimum period has already passed, the system proceeds to the next method operation.

The prediction apparatus 5 then calculates the total benefit 84 of a possible lane change. For this purpose, a current benefit contribution 85 of the possible lane change is firstly calculated. When the current benefit contribution 85 is calculated, a collision time 88 with a possible transportation vehicle to the front on a target lane is taken into account, wherein the current benefit contribution 85 is increased if the collision time 88 is longer than or equal to a predefined collision time threshold value 89, and wherein the current benefit contribution 85 is reduced if the collision time 88 is shorter than the predefined collision time threshold value 89. The predefined collision time threshold value 89 is dependent here on the calculated urgency level 80 of the intention of the transportation vehicle to the rear to overtake. Therefore, in the case of a transportation vehicle to the rear which is hassling, the collision time threshold value 89 can be lowered, with the result that the transportation vehicle accepts even relatively short gaps on the target lane, e.g., between trucks which are travelling one behind the other, to allow the transportation vehicle to the rear to pass. If the transportation vehicle to the rear is, on the other hand, hassling only to a small extent, the collision time threshold value 89 is adapted, as a function of the urgency level 80 of the intention to overtake, to accept gaps on the target lane with different dimensions.

Furthermore, in addition to the current benefit contribution 85, the prediction apparatus 5 also calculates a long-term benefit contribution 86 to the total benefit 84. In this context, for example, a change in a flow speed on the target lane after a possible lane change is taken into account, wherein the long-term benefit contribution 86 is reduced if the flow speed reduces after a possible lane change, and wherein the long-term benefit contribution 86 is increased if the flow speed increases after a possible lane change. A change in the flow speed on the target lane leads inevitably also to a change in a speed of the transportation vehicle 50. The change in the speed acts on a time period which the transportation vehicle 50 requires to travel over a total distance. If the change in the flow speed is large, for example, if a possible lane change from a current lane with a flow speed of 130 km/h leads to a target lane which is being travelled along by trucks which are travelling closely one behind the other and has a flow speed of merely 80 km/h, the influence on the time period to travel the total distance can be considerable.

If the prediction apparatus 5 has calculated the total benefit 84 for a possible lane change, the controller 3 then decides whether a possible lane change is carried out or not. To do this, the controller 3 compares the total benefit 84 with a total benefit threshold value 87. If the calculated total benefit 84 reaches the total benefit threshold value 87 or exceeds it, the possible lane change is carried out and the current lane is exited in favor of the transportation vehicle to the rear. The controller 3 then carries out the lane change by outputting corresponding control signals to the at least one actuator system 8 of the transportation vehicle 50, for example, via the interface 7. If the calculated total benefit 84 is below the total benefit threshold value 87, the possible lane change is not carried out.

Figure 2A:
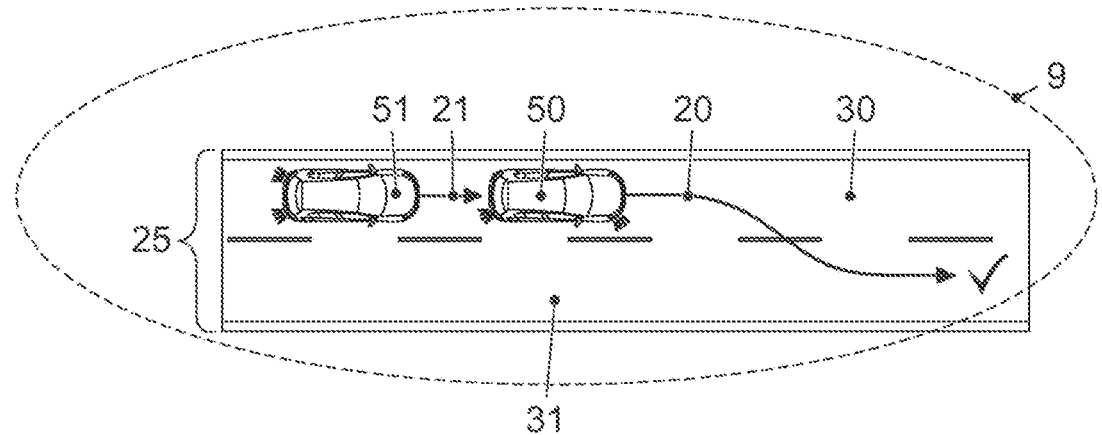
FIG. 2a shows a schematic illustration of a lane change in the case of positive overall benefit.
Figure 2B:
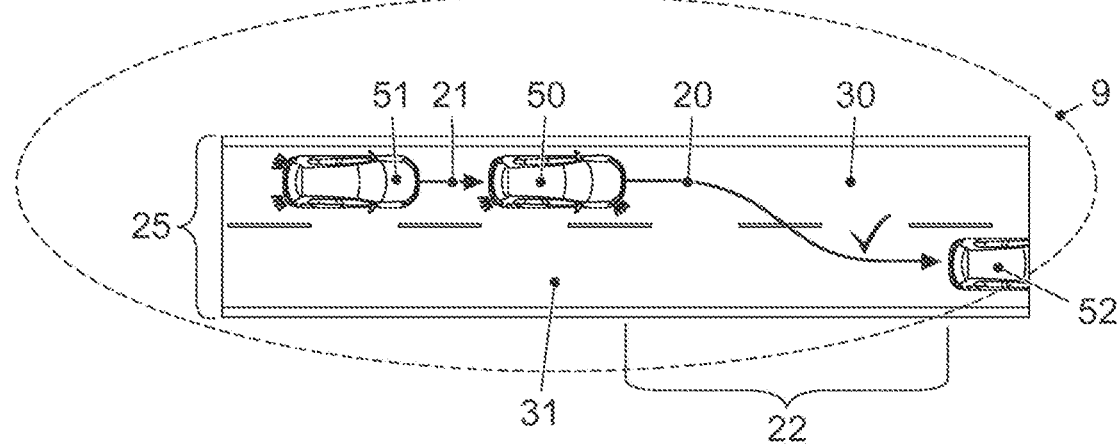
FIG. 2b shows a schematic illustration of a lane change in the case of positive overall benefit.
Figure 2C:
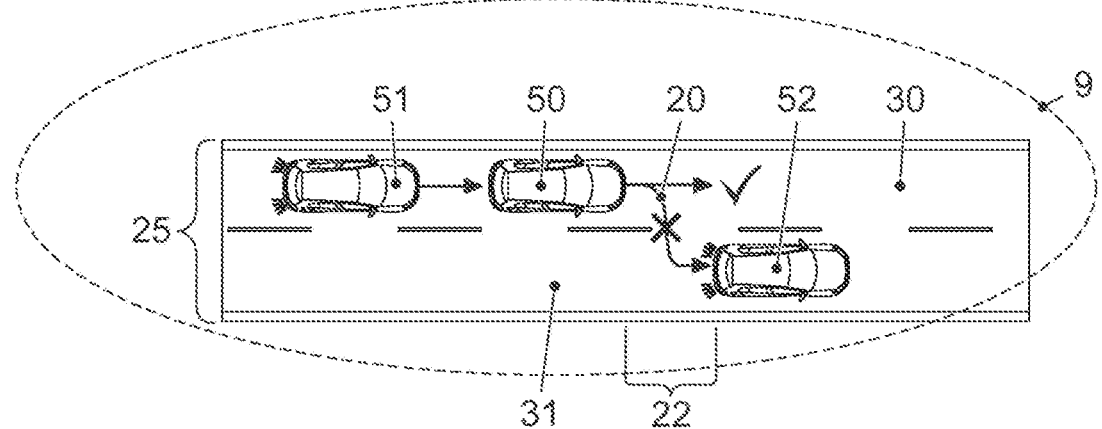
FIG. 2c shows a schematic illustration of the situation in which a lane change is not carried out.

FIGS. 2a to 2c show three possible situations on a road 25 to explain the method. Here, the same reference symbols in the figures also denote the same objects. In FIG. 2a, a transportation vehicle 50 and a transportation vehicle 51 to the rear are located on the two-lane road 25 with a current lane 30 and a target lane 31. The transportation vehicle 51 to the rear approaches the transportation vehicle 50 from behind at a higher speed than the speed of the transportation vehicle 50. The disclosed device detects the surroundings 9 of the transportation vehicle 50, identifies the intention to overtake and carries out the disclosed method. Here, a calculated total benefit exceeds a total benefit threshold value, so that a possible lane change 20 from the current lane 30 to the target lane 31 is carried out. In this example, the possible lane change 20 is beneficial because the transportation vehicle 50 can change from the current lane 30 to the target lane 31 without problems, since the target lane 31 is free.

FIG. 2b shows the same situation as in FIG. 2a, but a transportation vehicle 52 to the front is now located in front of the transportation vehicle 50 on the target lane 31. After the identification of the intention to overtake 21 of the transportation vehicle 51 to the rear, a total benefit is also calculated here. Here, the calculated total benefit also exceeds the total benefit threshold value, and a possible lane change 20 is carried out. In this example, the possible lane change 20 is still beneficial despite the transportation vehicle 52 to the front on the target lane, since the gap 22 behind the transportation vehicle 52 to the front is large enough, and therefore the collision time remains above a collision time threshold value.

In FIG. 2c, the situation which is shown in FIG. 2b is modified. The transportation vehicle 52 to the front is now located much closer in front of the transportation vehicle 50 on the target lane, with the result that the gap 22 which is available for the transportation vehicle 50 after a possible lane change 20 is very much smaller. A collision time undershoots the collision time threshold value here. As a result, the calculated total benefit does not exceed the total benefit threshold value, with the result that the possible lane change 20 is not carried out, and the transportation vehicle 50 remains on the current lane 30.

Figure 3:
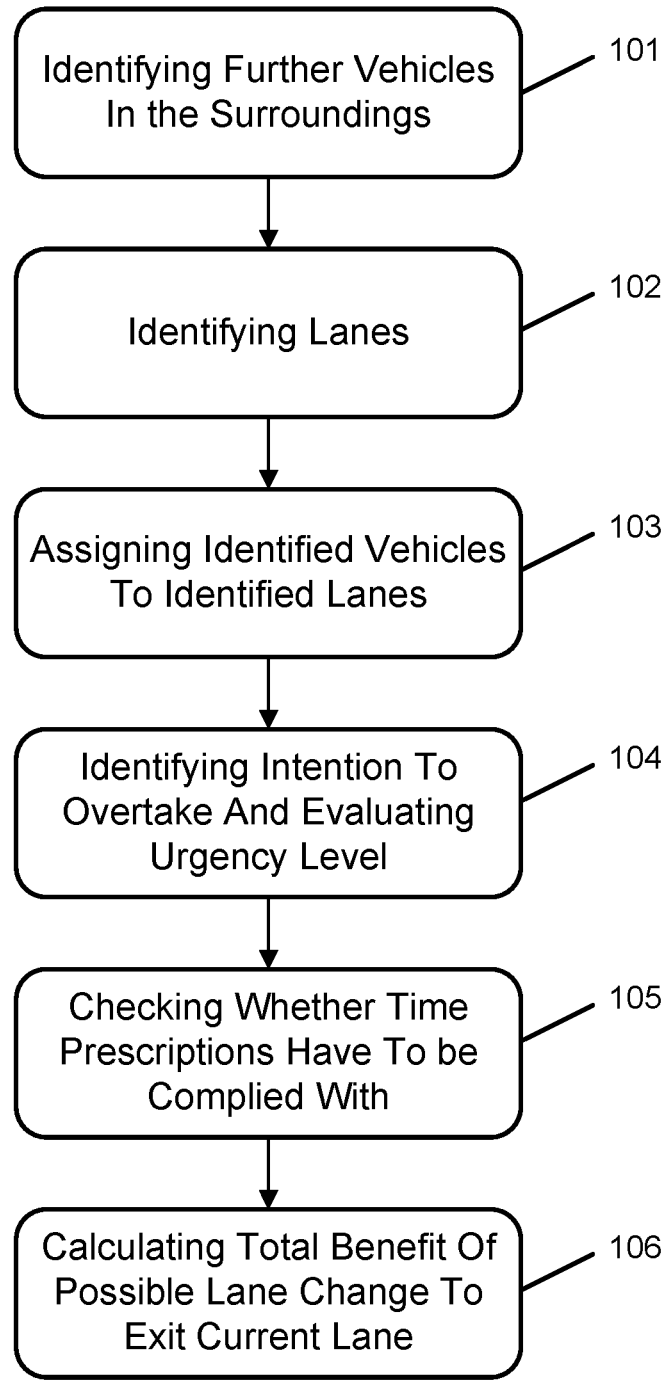
FIG. 3 shows a schematic flowchart for the calculation of the overall benefit of a lane change.

FIG. 3 shows a schematic flowchart for the calculation of the total benefit of a possible lane change. In the first method operation at 101, further transportation vehicles in the surroundings of the transportation vehicle are identified by a sensor system. Lanes are likewise identified by the sensor system 102. A controller then assigns the further identified transportation vehicles to the identified lanes 103. In the next operation at 104, an overtaking assistance apparatus identifies an intention to overtake of a further transportation vehicle to the rear and evaluates it by calculating an urgency level. In the next method operation at 105, a time prescription-checking apparatus then checks whether time prescriptions have to be complied with. In the last method operations at 106, a prediction apparatus calculates a total benefit of a possible lane change to exit the current lane. The method can then be repeated.

Figure 4:
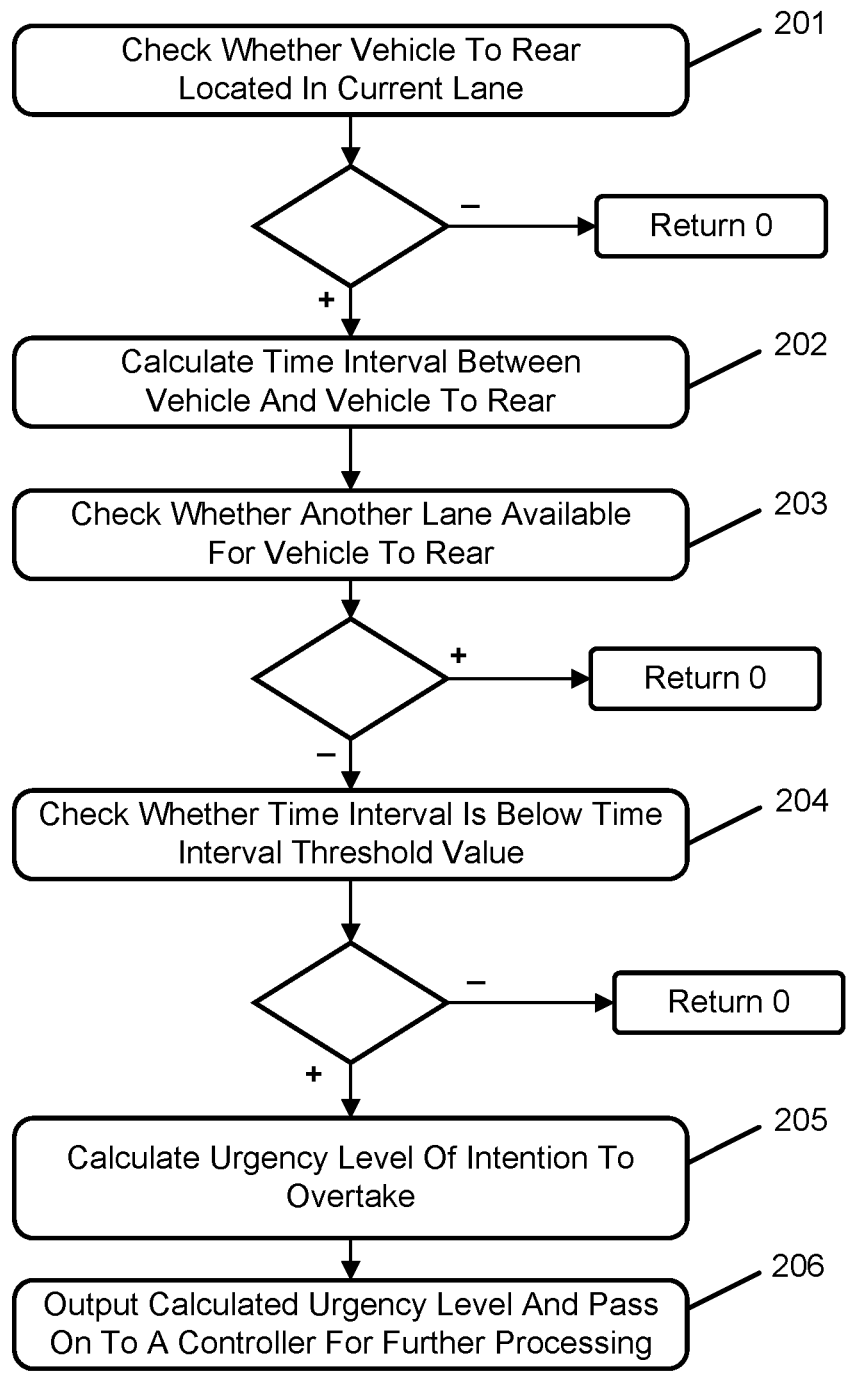
FIG. 4 shows a schematic flowchart for the evaluation of the urgency level of an intention of a transportation vehicle to the rear to overtake.

FIG. 4 shows a schematic flowchart for calculating an urgency level of an intention to overtake of a transportation vehicle to the rear. The calculation is carried out here by an overtaking assistance apparatus. In the first method operations at 201 it is checked whether a further transportation vehicle to the rear is located on a current lane behind a transportation vehicle. If this is not the case, nothing else is done. However, operations at 201 can be carried out repeatedly. If a transportation vehicle to the rear is identified on the current lane, a time interval between the transportation vehicle and the transportation vehicle to the rear is calculated 202. For this purpose, for example, a distance between the transportation vehicle to the rear and the transportation vehicle is divided by a relative speed between the two transportation vehicles. It is then checked 203 whether there is another lane which the transportation vehicle to the rear is able or allowed to use for overtaking. If this is the case, the method is firstly ended without further operations. If there is no other lane which is able or allowed to be used, in the next operations at 204 it is checked whether the time interval is below a time interval threshold value. If this is not the case, no further operations are carried out. If the time interval is, however, shorter than the time interval threshold value, an urgency level of the intention to overtake is calculated 205. Finally, 206, the calculated value for the urgency level is output by the overtaking assistance apparatus and passed on, for example, to a controller for further processing.

LIST OF REFERENCE NUMBERS

1 Device
2 Sensor system
3 Controller
4 Overtaking assistance apparatus
5 Prediction apparatus
6 Time prescription-checking apparatus
7 Interface
8 Actuator system
9 Surroundings
20 Lane change
21 Intention to overtake
22 Gap
25 Road
30 Current lane
31 Target lane
50 Transportation vehicle
51 Transportation vehicle to the rear
52 Transportation vehicle to the front
80 Urgency level
81 Time interval
82 Time interval threshold value
83 Time prescriptions
84 Total benefit
85 Current benefit contribution
86 Long-term benefit contribution
87 Total benefit threshold value
88 Collision time
89 Collision time threshold value
101-106 Method operations for calculating a total benefit
201-206 Method operations for calculating an urgency level

The invention claimed is:

1. A method in a transportation vehicle for automated driving, the method comprising:
   detecting other transportation vehicles in the surroundings of the transportation vehicle by at least one sensor system;
   detecting and identifying, by the at least one sensor system, lanes;
   assigning, by a controller of the transportation vehicle, the detected other transportation vehicles to the identified lanes;
   identifying and evaluating, by the controller, an intention to overtake the transportation vehicle by one of the other transportation vehicles;
   checking time prescriptions, by the controller, including checking a time period since a last completed lane change, and preventing a transition of the transportation vehicle from a current lane to a target lane in response to the time period since the last completed lane change undershooting a threshold value; and in response to the time period since the last completed lane change being greater than the threshold value, calculating, by the controller, a total benefit of the transition of the transportation vehicle from the current lane to the target lane, wherein the total benefit of the transition of the transportation vehicle from the current lane to the target lane increases if flow speed of the transportation vehicle after a possible lane change is expected to increase and decreases if the flow speed of the transportation vehicle after a possible lane change is expected to decrease, and adapting, by the controller, a driving behavior of the transportation vehicle, wherein the transition of the transportation vehicle from the current lane to the target lane is executed in response to the calculated total benefit reaching or exceeding a predefined total benefit threshold value, and wherein the transition of the transportation vehicle from the current lane to the target lane is not executed in response to the calculated total benefit falling below the predefined total benefit threshold value.

2. The method of claim 1, wherein the identification and evaluation of the intention to overtake by the controller comprises:

checking whether the one of the other transportation vehicles is located behind the transportation vehicle and whether the one of the other transportation vehicles is located in a same one of the identified lanes as a current lane of the transportation vehicle, and in response to the one of the other transportation vehicles being located in the same one of the identified lanes as the current lane of the transportation vehicle:
calculating a time interval between the one of the other transportation vehicles and the transportation vehicle;
checking whether an adjacent lane is available in which the one of the other transportation vehicles is able and allowed to overtake the transportation vehicle; and
in response to the adjacent lane being unavailable:
checking whether the calculated time interval is less than a predefined time interval threshold value, and
calculating an urgency level of the intention to overtake based on whether the time interval is less than the predefined time interval threshold value.

3. The method of claim 1, wherein the calculation of the total benefit of the transition of the transportation vehicle from the current lane to the target lane by the controller comprises:

calculating a current benefit contribution of the transition of the transportation vehicle from the current lane to the target lane; and
calculating a long-term benefit contribution of the transition of the transportation vehicle from the current lane to the target lane,
wherein the total benefit is calculated based on the current benefit contribution and the long-term benefit contribution.

4. The method of claim 3, wherein the calculation of the current benefit contribution is based on a collision time between the transportation vehicle and a second one of the other transportation vehicles travelling in the target lane, wherein the current benefit contribution is increased in response to the collision time being longer than or the same as a predefined collision time threshold value, and wherein the current benefit contribution is reduced in response to the collision time being shorter than the predefined collision time threshold value.

5. The method of claim 4, wherein the predefined collision time threshold value is based on an urgency level of the intention to overtake calculated by the controller.

6. The method of claim 3, wherein the calculation of the long-term benefit contribution is based on a predicted change in a flow speed of the transportation vehicle in response to transitioning to the target lane, wherein the long-term benefit contribution is reduced in response to a predicted decrease in the flow speed after a transition to the target lane, and wherein the long-term benefit contribution is increased in response to a predicted increase in the flow speed after the transition to the target lane.

7. A device in a transportation vehicle for automated driving, the device comprising:

at least one sensor system for detecting other transportation vehicles in vicinity of the transportation vehicle and for detecting and identifying lanes; and
a controller configured to:
assign the identified lanes to the other transportation vehicles, identify and evaluate an intention to overtake the transportation vehicle by one of the other transportation vehicles,
check time prescriptions by checking a time period since a last completed lane change and prevent a transition of the transportation vehicle from a current lane to a target lane in response to the time period since the last completed lane change undershooting a threshold value, and
in response to the time period since the last completed lane change being greater than the threshold value, calculate a total predicted benefit of the transition of the transportation vehicle from the current lane to the target lane, wherein the total benefit of the transition of the transportation vehicle from the current lane to the target lane increases if flow speed of the transportation vehicle after a possible lane change is expected to increase and decreases if the flow speed of the transportation vehicle after a possible lane change is expected to decrease,
wherein the controller adapts a driving behavior of the transportation vehicle by controlling at least one actuator system of the transportation vehicle, wherein the controller causes the transportation vehicle to transition from a current lane to a target lane in response to the calculated total benefit reaching or exceeding a predefined total benefit threshold value, and
wherein the controller prevents the transportation vehicle from transitioning from the current lane to the target lane in response to the calculated total benefit not exceeding the predefined total benefit threshold value.

* * * * *